(12) United States Patent
Uratani

(10) Patent No.: US 11,392,807 B2
(45) Date of Patent: Jul. 19, 2022

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Mitsuru Uratani, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/152,626

(22) Filed: Jan. 19, 2021

(65) Prior Publication Data

US 2021/0142130 A1 May 13, 2021

Related U.S. Application Data

(63) Continuation of application No. PCT/JP2019/024150, filed on Jun. 18, 2019.

(30) Foreign Application Priority Data

Jul. 25, 2018 (JP) .............................. JP2018-139280

(51) Int. Cl.
*G06K 15/02* (2006.01)

(52) U.S. Cl.
CPC ..... *G06K 15/1878* (2013.01); *G06K 15/1807* (2013.01); *G06K 15/1822* (2013.01);
(Continued)

(58) Field of Classification Search
CPC ........... G06K 15/1878; G06K 15/1807; G06K 15/1825; G06K 15/1868; G06K 15/1884; G06K 15/188; G06T 1/00; H04N 1/60
See application file for complete search history.

(56) References Cited

U.S. PATENT DOCUMENTS

| 7,355,750 B2 | 4/2008 | Saito et al. .................... 358/1.9 |
| 7,365,890 B2 | 4/2008 | Saito et al. .................... 358/523 |

(Continued)

FOREIGN PATENT DOCUMENTS

| JP | 2005-354414 | 12/2005 |
| JP | 2007-208531 | 8/2007 |

(Continued)

OTHER PUBLICATIONS

International Search Report and Written Opinion in counterpart International Application No. PCT/JP2019/024150.

*Primary Examiner* — King Y Poon
*Assistant Examiner* — Michael Burleson
(74) *Attorney, Agent, or Firm* — Venable LLP

(57) ABSTRACT

The image processing apparatus includes: a color conversion unit configured to convert an input color space of the document image data into a device-dependent color space specified by the plurality of color materials; and an output unit configured to output the document image data converted into the device-dependent color space, and the color conversion unit performs, in a case where the document image data includes a first kind of object and a second kind of object different from the first kind, the conversion by selectively applying a first color conversion method of converting data corresponding to the first kind of object into data represented in a first color space and a second color conversion method of converting data corresponding to the second kind of object into data represented in a second color space different from the first color space within one print job.

16 Claims, 12 Drawing Sheets

(52) U.S. Cl.
CPC ..... *G06K 15/1825* (2013.01); *G06K 15/1868* (2013.01); *G06K 15/1882* (2013.01)

(56) References Cited

U.S. PATENT DOCUMENTS

| | | | | |
|---|---|---|---|---|
| 7,679,795 | B2 | 3/2010 | Oki | 358/518 |
| 8,456,709 | B2 | 6/2013 | Uratani et al. | 358/3.23 |
| 8,861,025 | B2 | 10/2014 | Hoshino | 358/1.9 |
| 9,098,782 | B2 | 8/2015 | Uratani et al. | G06K 15/027 |
| 10,073,947 | B2 * | 9/2018 | Taguchi | H04N 1/6027 |
| 2005/0275856 | A1 * | 12/2005 | Oki | G06K 15/1852 |
| | | | | 358/1.9 |
| 2007/0177173 | A1 * | 8/2007 | Nishikawa | G06K 15/1848 |
| | | | | 358/1.9 |
| 2010/0277753 | A1 * | 11/2010 | Shinchi | H04N 1/603 |
| | | | | 358/1.9 |
| 2010/0321713 | A1 | 12/2010 | Nishikawa | 358/1.9 |
| 2013/0003090 | A1 * | 1/2013 | Sato | G03G 15/5062 |
| | | | | 358/1.9 |
| 2013/0100468 | A1 | 4/2013 | Hoshino | 358/1.9 |
| 2013/0222859 | A1 | 8/2013 | Uratani et al. | 358/3.24 |

FOREIGN PATENT DOCUMENTS

| | | |
|---|---|---|
| JP | 2008-160476 | 7/2008 |
| JP | 2013-090261 | 5/2013 |
| JP | 2013-183184 | 9/2013 |

\* cited by examiner

| Input | | | | Output-1 (pure color maintained) | | | | Output-2 (normal conversion) | | | |
|---|---|---|---|---|---|---|---|---|---|---|---|
| C | M | Y | K | C | M | Y | K | C | M | Y | K |
| 100% | 0% | 0% | 0% | 100% | 0% | 0% | 0% | 100% | 30% | 7% | 2% |
| 75% | 0% | 0% | 0% | 75% | 0% | 0% | 0% | 82% | 5% | 5% | 0% |
| 50% | 0% | 0% | 0% | 50% | 0% | 0% | 0% | 58% | 0% | 5% | 0% |
| 25% | 0% | 0% | 0% | 25% | 0% | 0% | 0% | 33% | 0% | 4% | 0% |
| 0% | 100% | 0% | 0% | 0% | 100% | 0% | 0% | 11% | 100% | 27% | 4% |
| 0% | 75% | 0% | 0% | 0% | 75% | 0% | 0% | 9% | 82% | 0% | 0% |
| 0% | 50% | 0% | 0% | 0% | 50% | 0% | 0% | 5% | 58% | 0% | 0% |
| 0% | 25% | 0% | 0% | 0% | 25% | 0% | 0% | 2% | 33% | 0% | 0% |
| 0% | 0% | 100% | 0% | 0% | 0% | 100% | 0% | 2% | 4% | 100% | 0% |
| 0% | 0% | 75% | 0% | 0% | 0% | 75% | 0% | 5% | 0% | 78% | 0% |
| 0% | 0% | 50% | 0% | 0% | 0% | 50% | 0% | 4% | 0% | 56% | 0% |
| 0% | 0% | 25% | 0% | 0% | 0% | 25% | 0% | 3% | 0% | 33% | 0% |
| 0% | 0% | 0% | 100% | 0% | 0% | 0% | 100% | 91% | 79% | 61% | 96% |
| 0% | 0% | 0% | 75% | 0% | 0% | 0% | 75% | 58% | 48% | 49% | 40% |
| 0% | 0% | 0% | 50% | 0% | 0% | 0% | 50% | 43% | 33% | 35% | 13% |
| 0% | 0% | 0% | 25% | 0% | 0% | 0% | 25% | 25% | 18% | 20% | 2% |
| 0% | 50% | 0% | 0% | — | — | — | — | 58% | 56% | 0% | 0% |
| 0% | 75% | 0% | 25% | — | — | — | — | 30% | 85% | 20% | 4% |
| 0% | 25% | 50% | 75% | — | — | — | — | 47% | 55% | 74% | 56% |
| 75% | 25% | 50% | 25% | — | — | — | — | 84% | 31% | 57% | 20% |

Output-1: MAINTAIN PURE COLOR STATE

Output-2: NORMAL CONVERSION BECAUSE OF BEING NOT PURE COLOR

| Input | | | Pure color determination complementally color result | | | | Output-1 (pure color maintained) | | | | Output-2 (normal conversion) | | | | Output-2' | | | |
|---|---|---|---|---|---|---|---|---|---|---|---|---|---|---|---|---|---|---|
| R | G | B | C | M | Y | K | C | M | Y | K | C | M | Y | K | C | M | Y | K |
| 0% | 100% | 100% | 100% | 0% | 0% | 0% | 100% | 0% | 0% | 0% | 57% | 0% | 18% | 0% | 57% | 0% | 18% | 0% |
| 25% | 100% | 100% | 75% | 0% | 0% | 0% | 86% | 0% | 0% | 0% | 55% | 0% | 18% | 0% | 55% | 0% | 18% | 0% |
| 50% | 100% | 100% | 50% | 0% | 0% | 0% | 64% | 0% | 0% | 0% | 45% | 0% | 15% | 0% | 45% | 0% | 15% | 0% |
| 75% | 100% | 100% | 25% | 0% | 0% | 0% | 35% | 0% | 0% | 0% | 29% | 0% | 19% | 0% | 29% | 0% | 19% | 0% |
| 100% | 100% | 100% | 0% | 0% | 0% | 0% | 0% | 0% | 0% | 0% | 43% | 78% | 0% | 0% | 43% | 78% | 0% | 0% |
| 100% | 25% | 100% | 0% | 75% | 0% | 0% | 0% | 86% | 0% | 0% | 38% | 72% | 0% | 0% | 38% | 72% | 0% | 0% |
| 100% | 50% | 100% | 0% | 50% | 0% | 0% | 0% | 64% | 0% | 0% | 25% | 56% | 0% | 0% | 25% | 56% | 0% | 0% |
| 100% | 75% | 100% | 0% | 25% | 0% | 0% | 0% | 35% | 0% | 0% | 11% | 33% | 0% | 0% | 11% | 33% | 0% | 0% |
| 100% | 100% | 100% | 0% | 0% | 0% | 0% | 0% | 0% | 0% | 0% | 13% | 0% | 84% | 0% | 13% | 0% | 84% | 0% |
| 100% | 100% | 25% | 0% | 0% | 75% | 0% | 0% | 0% | 86% | 0% | 12% | 0% | 76% | 0% | 12% | 0% | 76% | 0% |
| 100% | 100% | 50% | 0% | 0% | 50% | 0% | 0% | 0% | 64% | 0% | 9% | 0% | 58% | 0% | 9% | 0% | 58% | 0% |
| 100% | 100% | 75% | 0% | 0% | 25% | 0% | 0% | 0% | 35% | 0% | 5% | 0% | 34% | 0% | 5% | 0% | 34% | 0% |
| 0% | 0% | 0% | 0% | 0% | 0% | 100% | 0% | 0% | 0% | 100% | 91% | 79% | 62% | 98% | 9% | 8% | 6% | 98% |
| 25% | 25% | 25% | 0% | 0% | 0% | 75% | 0% | 0% | 0% | 86% | 65% | 56% | 53% | 57% | 9% | 8% | 5% | 85% |
| 50% | 50% | 50% | 0% | 0% | 0% | 50% | 0% | 0% | 0% | 64% | 49% | 39% | 39% | 20% | 7% | 6% | 4% | 58% |
| 75% | 75% | 75% | 0% | 0% | 0% | 25% | 0% | 0% | 0% | 35% | 28% | 21% | 22% | 3% | 5% | 4% | 2% | 30% |
| 50% | 0% | 50% | 0% | 100% | 0% | 0% | — | — | — | — | 30% | 100% | 100% | 42% | 30% | 100% | 100% | 42% |
| 0% | 0% | 75% | 100% | 100% | 0% | 0% | — | — | — | — | 100% | 88% | 5% | 1% | 100% | 88% | 5% | 1% |
| 25% | 75% | 0% | 67% | 0% | 100% | 0% | — | — | — | — | 21% | 83% | 100% | 12% | 21% | 83% | 100% | 12% |
| 75% | 25% | 25% | 0% | 67% | 67% | 0% | — | — | — | — | 21% | 84% | 70% | 12% | 21% | 84% | 70% | 12% |

MAINTAIN PURE COLOR STATE (Output-1, Output-2)

NORMAL CONVERSION BECAUSE OF BEING NOT PURE COLOR (Output-2')

IMAGE PROCESSING APPARATUS, IMAGE PROCESSING METHOD, AND STORAGE MEDIUM

CROSS-REFERENCE TO RELATED APPLICATIONS

This application is a Continuation of International Patent Application No. PCT/JP2019/024150, filed Jun. 18, 2019, which claims the benefit of Japanese Patent Application No. 2018-139280, filed Jul. 25, 2018, both of which are hereby incorporated by reference herein in their entirety.

BACKGROUND

Technical Field

The present disclosure relates to a printing system that performs printing by performing color conversion for a document image.

Background Art

Color management of a printing system used for commercial printing is controlled by using a device-dependent color space specified by a color material (in the following, also referred to as "ink") used mainly in a printing machine. The reason is that directly controlling the color material used for printing is reasonable in order to manage the output quality and cost. Because of this, generally, a document image for printing is created in a CMYK color space specified by the color material color from the beginning. The series of printing process in accordance with the CMYK color space is also called "CMYK work flow".

On the other hand, for color management in an ink jet printer or the like, which is used as a peripheral of a personal computer, an RGB color space is used mainly and control is performed by using a device-dependent color space specified by the axis different from that of ink in the commercial printing. The reason is that using RGB, which is the color space of color filters of a display, a camera, and a scanner, which are main peripherals of a personal computer, is reasonable for keeping high reproducibility of colors and tones of RGB-originated data, such as a photo. Because of this, in many case, an image that is created on a personal computer is created in the RGB color space, including a document image for printing. The series of printing process in accordance with the RGB color space such as this is also called "RGB work flow".

In the context such as this, in the recent digitized commercial printing, in addition to document images created in the conventional CMYK work flow, document images created in the RGB work flow increase in number. Further, there is a case where it is desired to mix a document image created in the CMYK work flow and a document image created in the RGB work flow, for example, for each page or within a page in one print job. Conventionally, this case is dealt with by a method of performing batch conversion for both document images into those represented in the CMYK color space, with reproducibility of the portion relating to the RGB work flow being sacrificed, or by a method of performing printing separately for the portion in accordance with the CMYK work flow and for the portion in accordance with the RGB work flow. For example, as a document that discloses a method of performing printing a plurality of times by dividing printing for the portion in accordance with the CMYK work flow and for the portion in accordance with the RGB work flow, there is a Patent Citation List

PATENT LITERATURE

Patent Literature 1 Japanese Patent Laid-Open No. 2013-183184

SUMMARY

In both the dealing methods described above, the axis of the color space of the input document image and the axis of the device-dependent color space of the outputting printing machine are made the same, but only by this, there is a case where the printing results are not those intended by a person who has created the document image.

The color space conversion represented by the ICC profile basically premises that the color reproducibility is kept high before and after the conversion. Because of this, by the simple conversion from CMYK into CMYK, the ink configuration after the conversion is not guaranteed. For example, in a case where the chromaticity of ink is different between the color space of the input document image and the device-dependent color space, it may happen that another ink enters the portion after the conversion, for which a specific single color ink is designated for the purpose of keeping color reproducibility. Further, in a case where the output is performed by commercial printing, even a document image created in the RGB work flow may have the contents for which it is desired to manage the quality and cost by controlling the ink used for printing, as in the CMYK work flow. In the case such as this, even by simply performing conversion from RGB into RGB, the ink itself cannot be controlled, and therefore, it is not possible to fulfill the purpose.

Consequently, an object of the present invention is to provide a printing system capable of performing, even in a case where a portion for which it is desired to control the quality and cost by performing printing only with a specific ink and the other portion exist in a mixed manner in one print job, color conversion desirable for both the portions, respectively.

The image processing apparatus according to the present invention is an image processing apparatus for printing an image by using a plurality of color materials based on document image data included in a print job, and includes: a color conversion unit configured to convert an input color space of the document image data into a device-dependent color space specified by the plurality of color materials; and an output unit configured to output the document image data converted into the device-dependent color space, and the color conversion unit performs, in a case where the document image data includes a first kind of object and a second kind of object different from the first kind, the conversion by selectively applying a first color conversion method of converting data corresponding to the first kind of object into data represented in a first color space and a second color conversion method of converting data corresponding to the second kind of object into data represented in a second color space different from the first color space within one print job.

According to the present invention, it is possible to properly use a color conversion method separately for an area for which it is preferable to perform printing by using only a specific color material and the other area in a document image of one print job.

Further features of the present invention will become apparent from explanation of the following embodiments, which is given with reference to the attached drawings.

BRIEF DESCRIPTION OF THE DRAWINGS

FIG. 7A and FIG. 7B are each a diagram showing an example of a relationship between input signal values and output signal values;

DESCRIPTION OF THE EMBODIMENTS

In the following, with reference to the attached drawings, embodiments that embody the present invention are explained. The configurations shown in the following embodiments are merely exemplary and the present disclosure is not limited to the configurations shown schematically.

First Embodiment

Figure 1:
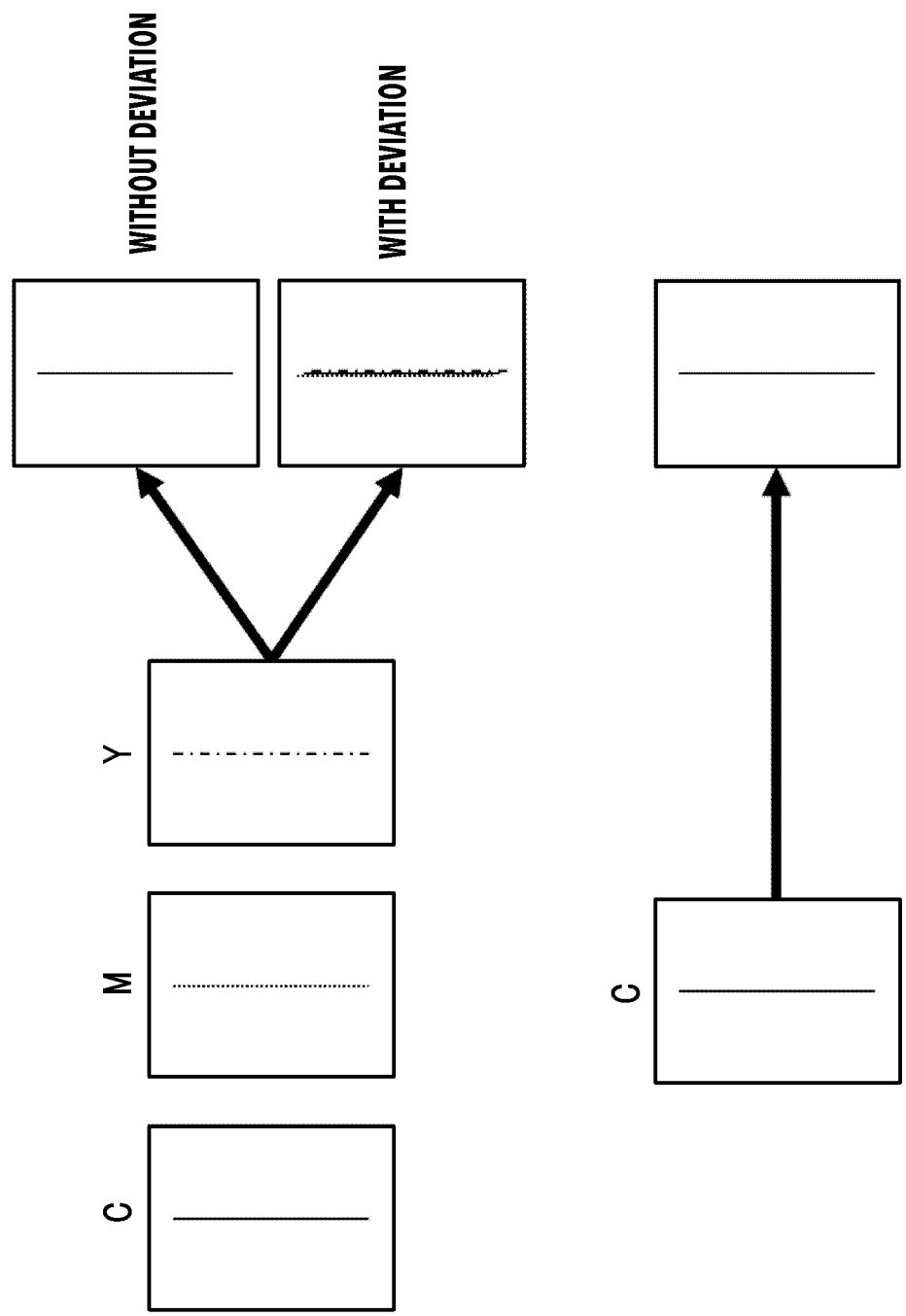
FIG. 1A is a diagram showing an example of a case where three CMY planes are overlapped without deviation and a case where they are overlapped with deviation and FIG. 1B is a diagram showing an example in a case where printing is performed by designating a single color of C.

In the CMYK work flow in which the color space at the time of creating a document image is the CMYK color space, the color of a character or line within the image is designated by, for example, an 8-bit tone value (0 to 255) for each of CMYK. Many printing machines for commercial printing adopt a method of producing a plane for each ink and coloring and overlapping them. Because of this, in a case where the position at which the planes are colored and overlapped deviates, the character or line is thickened, blurred, or seems to be another color. FIG. 1A shows an example of a case where three planes of CMY are overlapped without deviation and a case where they are overlapped with deviation. Consequently, a method is known that controls the print quality by designating a single color ink for a character or line so that the influence does not appear even in a case where each plane deviates. FIG. 1B shows an example of a case where printing is performed by designating a single color of C. Here, explanation is given by taking a plane deviation that occurs frequently in the commercial printing as an example, but the same problem occurs by a deviation of the color material landing position even in a case of an ink jet printing machine that does not use planes. Further, a method, such as UCR or GCR, is also well known which suppresses the total amount of used ink by replacing the process black portion consisting of the three color inks of CMY with the single color K ink.

Figure 2:
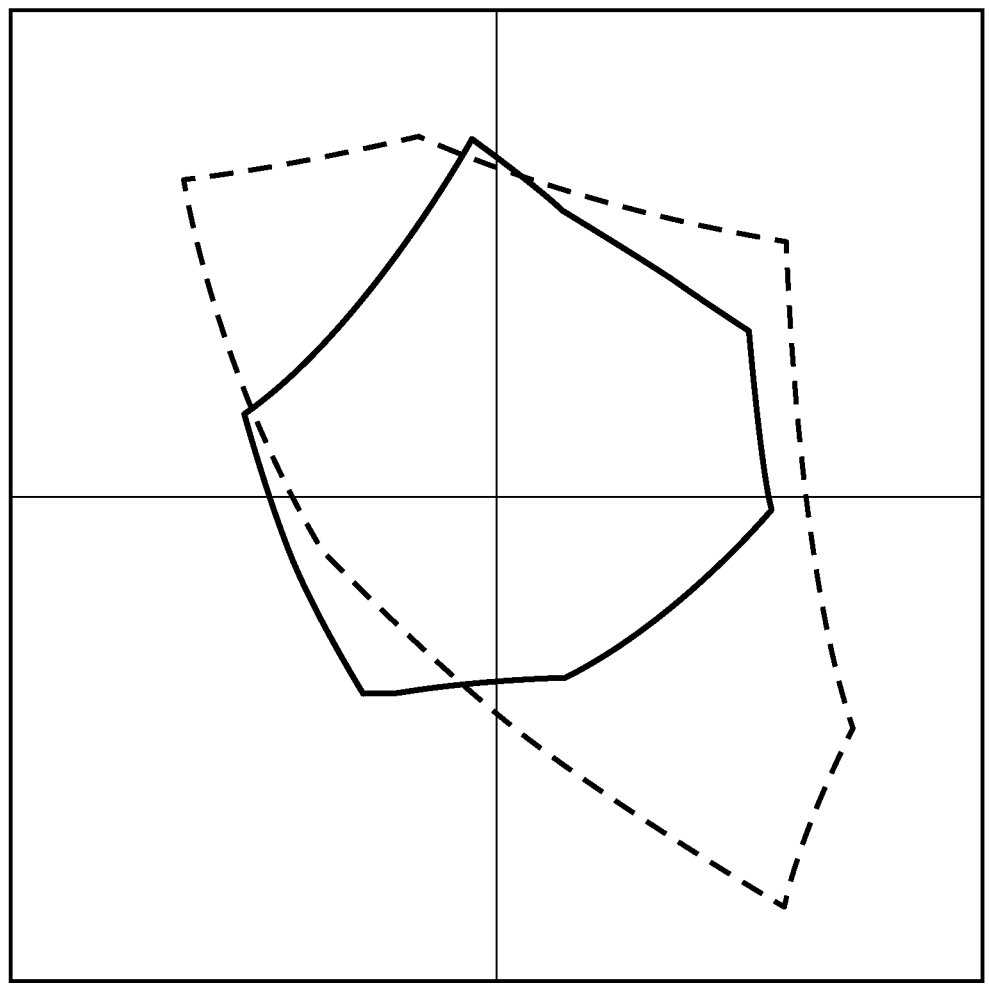
FIG. 2 is a diagram showing color gamuts of a device-dependent color space specified by ink and a general-purpose RGB color space.

In the RGB work flow in which the RGB color space is used as the color space at the time of creating a document image, particularly in a case of a photo document, sRGB intended for a general-purpose display output is used. Alternatively, there is a case where a wide color gamut RGB color space, such as DCI-P3 or BT.2020, intended for a wide color gamut is used. It is possible to convert one color space into another and vice versa among these color spaces, but in a case where a wide color space is converted into a narrow color space, information will be lost. Because of this, in order to maintain the color reproducibility, generally, the conversion into a narrow color space is performed in a back-end process in a case where this is possible. FIG. 2 is a diagram in which the color gamut of sRGB and the color gamut of a standard commercial printing machine (Press) are plotted on the ab plane of the CIE Lab space. As shown in FIG. 2, the device color space based on the ink of the printing machine is far narrower than the general-purpose sRGB color space. Further, the number of channels increases in accordance with the number of ink colors, and therefore, there is a tendency for the amount of data necessary to maintain the tone information on the RGB color space to increase. In view of those, in the RGB work flow, it is desirable to perform conversion into the device-dependent space of the printing machine at the last of the color conversion and to use a color space whose number of channels is comparatively small, such as RGB, instead of the device-dependent color space specified by the ink.

On the other hand, even in a case of a document image of RGB created in the RGB work flow, in the commercial printing, it is desirable that the single color ink can be used for an object, such as a character and a line. At that time, it is necessary to perform color conversion capable of controlling the single color ink also from the RGB color space so that, for example, RGB=(100%, 100%, 0%) becomes CMYK=(100%, 0%, 0%, 0%).

(Creation Method of Printing Document Image)

Figure 3:
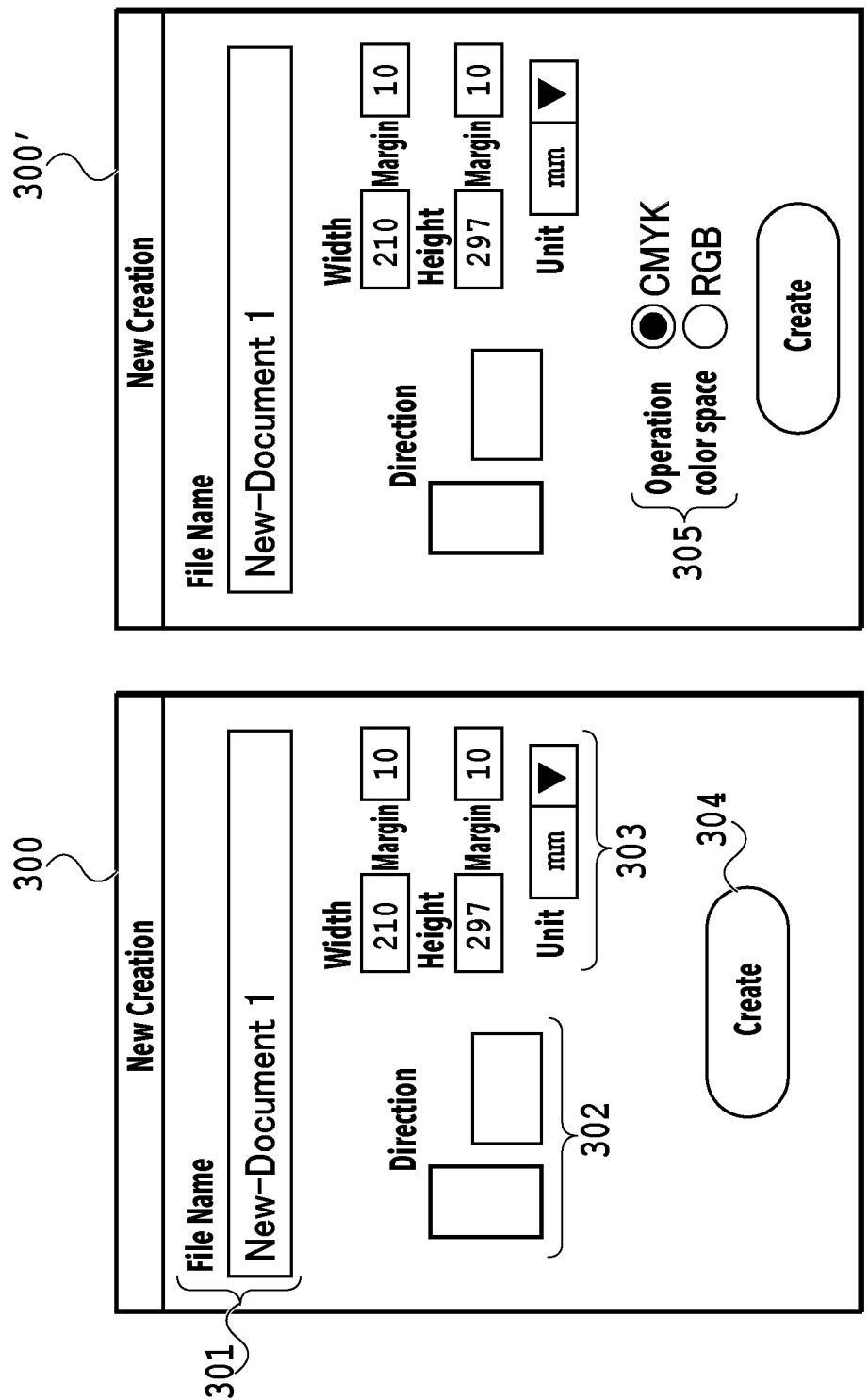
FIG. 3A and FIG. 3B are each a diagram showing an example of a UI screen of a document creation application.

Before explanation of technical items, which are features of the present embodiment, is given, a general creation method of a printing document image is explained. For creation of a printing document image, a dedicated document creation application is used. FIG. 3A and FIG. 3B are each a diagram showing an example of a UI screen that is displayed on a monitor or the like of a client PC (not shown schematically) or the like in which a document creation application is installed. On a UI screen 300 in FIG. 3A, a File Name input field 301, a sheet direction setting field 302, and a sheet size input field 303 are included and in a case where a printing document image is created anew, it is necessary to perform sheet setting of, such as the orientation of a sheet (document) and the sheet size. Further, a dedicated application further having an Operation color space setting field 305 as on a UI screen 300' in FIG. 3B also exists. This case means that it is not possible for a plurality of operation color spaces to exist in a mixed manner within one page. However, it is also possible to make a document image created for each page into one printing document image by merging document images by another application. Because of this, even in a case where a printing document image is created by using the document creation application as described above, it may happen that a plurality of operation color spaces exists in a mixed manner within one print job.

Figure 4:
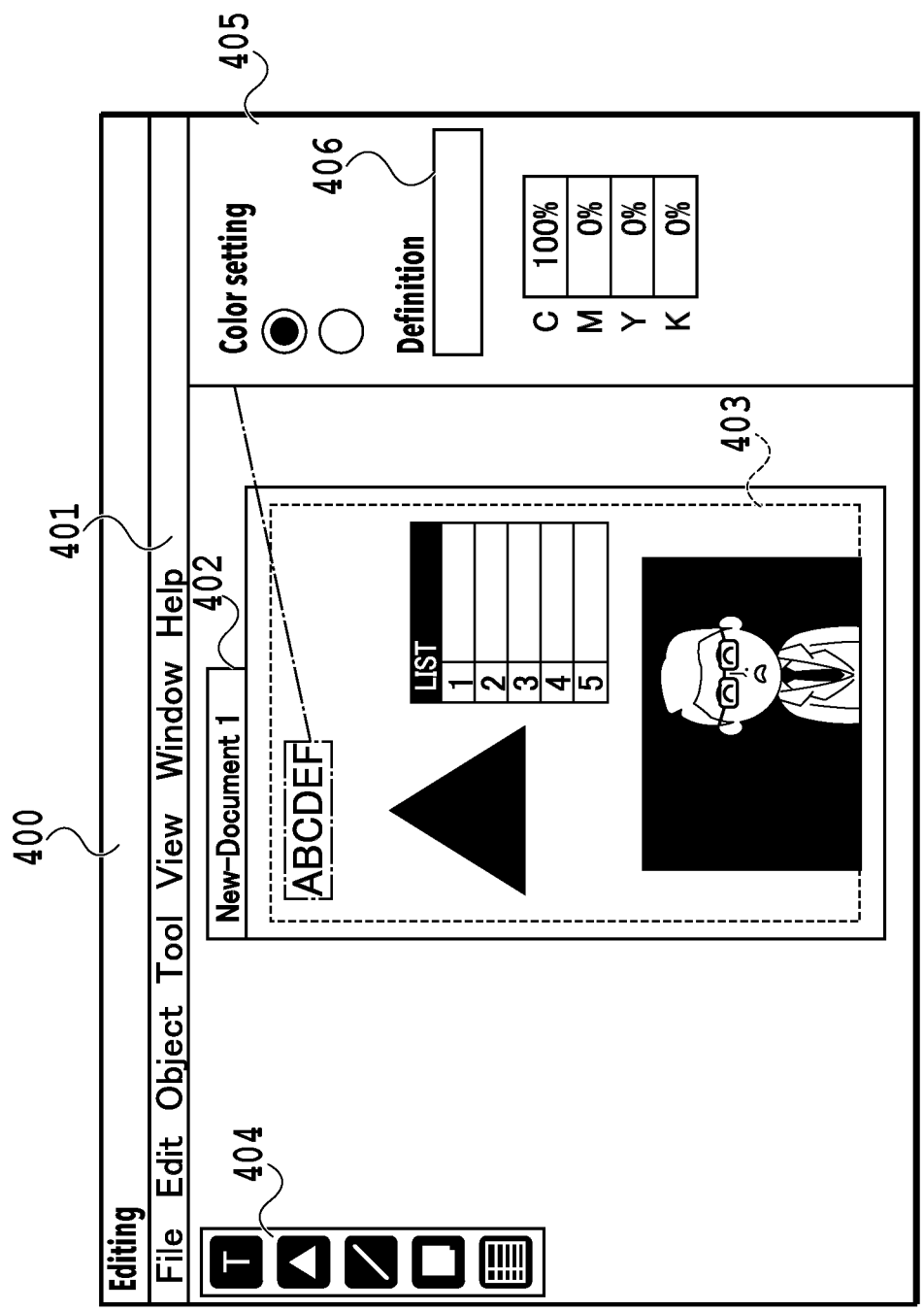
FIG. 4 is a diagram showing an example of an editing screen in a document editing application.

In a case where a Create button 304 is pressed down at the point in time of completion of sheet setting, an editing UI screen on which an empty document image (without contents) exits is displayed. FIG. 4 is a diagram showing an example of an editing UI screen. On an Editing UI screen 400, there are a menu bar 401 and a tool bar 404 and an operator arranges desired objects on a document screen 402 by operating these bars. The kind (attribute) of object is roughly divided into image, graphic, and text. In a case where operation color space designation at the time of new creation is not necessary, it is possible to designate a color space for each object in a sub window 405 that is displayed at the time of selection of an object. A color space definition field 406 is used in a case where it is desired to perform more detailed color space definition. Further, it is also possible to directly set a tone value to an object, such as graphic and character. It is possible to save the document image thus created in a predetermined file format, such as PDF, with information on the kind of object, the color space, and the tone value being kept, and input in a printing system.

(Configuration of Printing System)

Following the above, the printing system of the present embodiment is explained. As the printing system of the present embodiment, a commercial printing system is supposed, which performs printing by directly opening a document image file, or performs printing by receiving a print job creased by a printing management application, such as a work flow RIP, based on a document image file. Further, it is assumed that an ink jet printing method is adopted and ink used for printing has four colors of cyan, magenta, yellow, and black. The ink jet printing method is a well-known technique and is not the feature of the present invention, and therefore, detailed explanation thereof is omitted.

Figure 5:
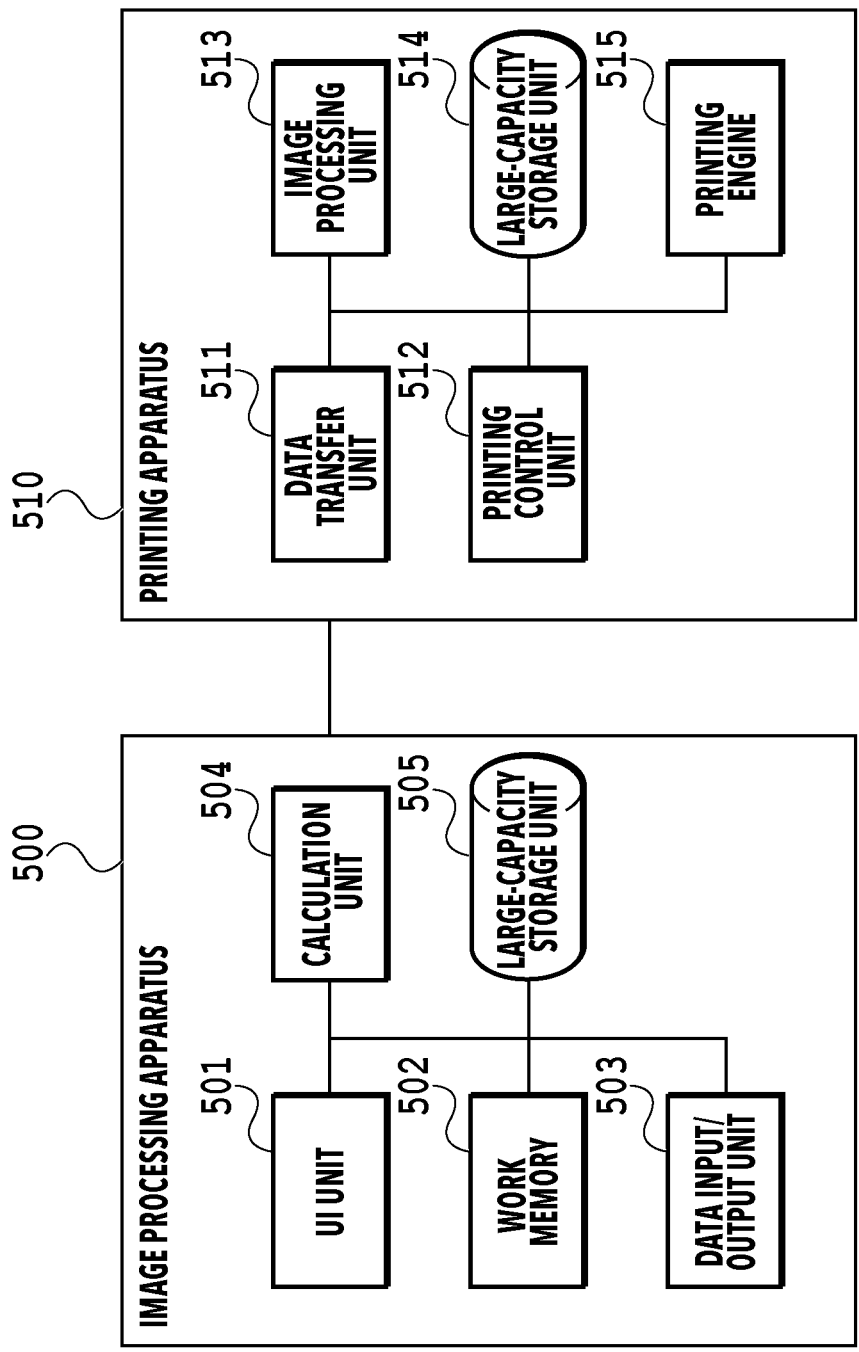
FIG. 5 is a diagram showing an example of a configuration of a printing system.

FIG. 5 is a diagram showing an example of the configuration of the printing system including an image processing apparatus and a printing apparatus according to the present embodiment. An image processing apparatus 500 gives printing instructions to a printing apparatus 510, transfers necessary information and data, performs conversion processing into a device-dependent color spade, and so on. The data transfer between the image processing apparatus 500 and the printing apparatus 510 is performed via an interface, such as a network, USB, or local bus.

First, the image processing apparatus 500 is explained. The image processing apparatus 500 comprises a UI unit 501, a work memory 502, a data input/output unit 503, a calculation unit 504, and a large-capacity storage unit 505. The UI unit 501 is in charge of a user interface function for a user to perform various kinds of input including color setting and the like, to be described later, and to display information necessary for a user. The UI unit 501 generally includes an input device, such as a keyboard and a mouse, and an output device, such as a liquid crystal display, but may be a touch panel or the like having the input/output function.

The large-capacity storage unit 505 includes an HDD and an SSD and stores and manages data, such as various setting values and parameters necessary for various kinds of processing, in addition to software, such as the OS and the system program. The calculation unit 504 includes a CPU and a GPU and executes the above-described software stored in the large-capacity storage unit 505 by using the work memory 502. That is, the calculation unit 504 implements each process, which is explained in the following, by giving instructions to each unit within the apparatus and transferring information. The data input/output unit 503 is an interface that inputs a print job and transfers data to the printing apparatus 510.

Next, the printing apparatus 510 is explained. The printing apparatus 510 comprises a data transfer unit 511, a printing control unit 512, an image processing unit 513, a large-capacity storage unit 514, and a printing engine 515. The print job that is output from the image processing apparatus 500 is received by the data transfer unit 511. The print job includes document image data, printing setting information, color space information (device-dependent color space after color conversion and information relating to the area thereof) and the like. The data transfer unit 511 sends the document image data and the color space information of the received print job to the image processing unit 513 and sends the printing setting information to the printing control unit 512. The printing control unit 512 controls the operation of the printing engine 515 in accordance with the printing setting information. The printing engine 515 includes a print head that ejects ink, a supply system that supplies ink to the print had, and the like and performs an ink ejection operation in accordance with image data for which the series of image processing has been performed by the image processing unit 513, to be described later.

The printing system shown in FIG. 5 is configured such that the image processing apparatus 500 and the printing apparatus 510 are independent of each other, but for example, the image processing apparatus 500 may be contained within the printing apparatus 510.

(Sequence of Printing System)

Figure 6:
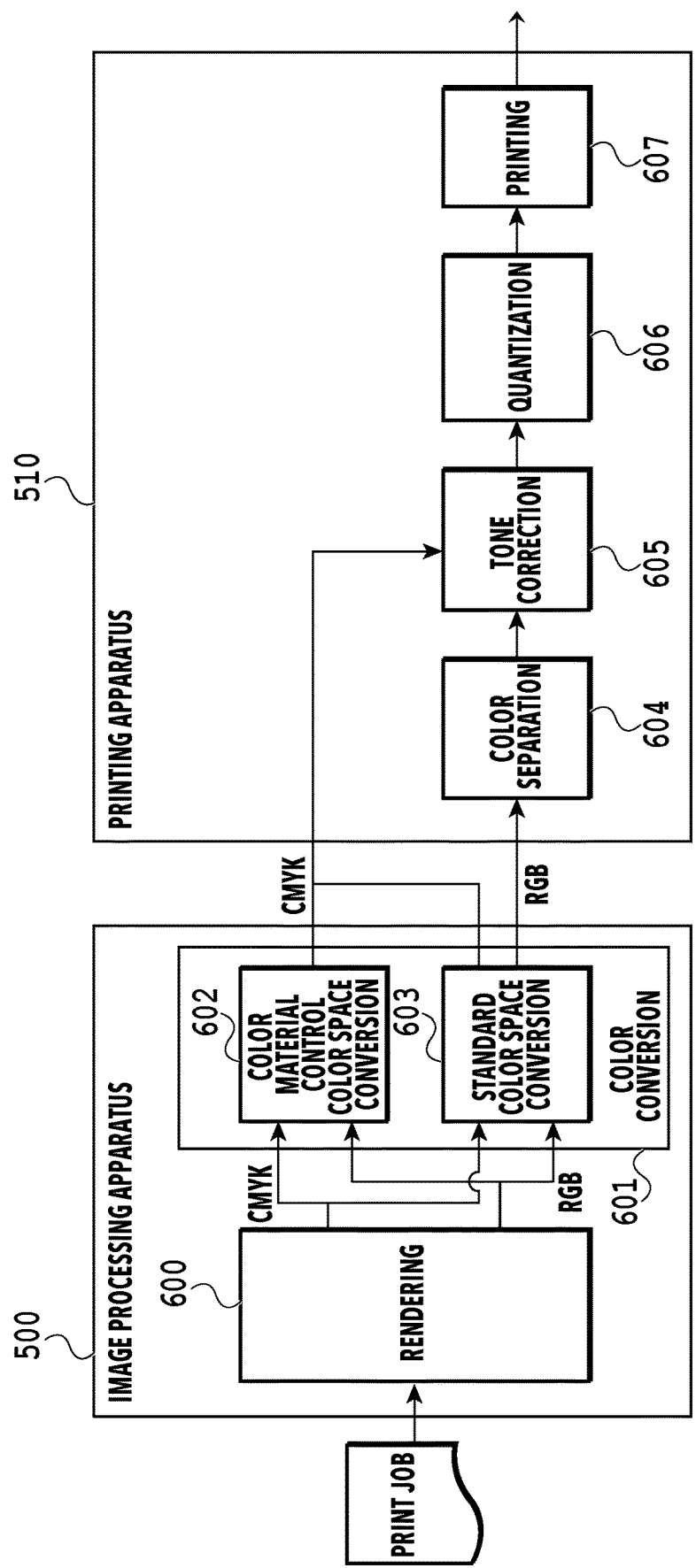
FIG. 6 is a diagram showing a sequence of a printing processing process.

FIG. 6 is a diagram showing a sequence of a printing processing process in the printing system of the present embodiment. Here, it is assumed that in the print job that is input to the image processing apparatus 500, an object created in the RGB operation color space specified by the luminance signal values of RGB or an object created in the CMYK operation color space specified by the ink use amount of CMYK exists in a mixed manner.

First, in a rendering process 600, rendering processing is performed for document image data within the print job. Then, after the rendering processing, for the image signal values of the target object within the document image, processing to determine contents that are applied in a next color conversion process 601 is performed. In the color conversion process 601 of the present embodiment, two color conversion method, that is, color material control color space conversion 602 and standard color space conversion 603 are selectively switched and applied. Because of this, prior to the execution of the color conversion process 601, whether to apply the color material control color space conversion 602 or to apply the standard color space conversion 603 to the image signal values of the target object within the document image is determined. This determination method will be described later.

In a case where the contents of the color conversion process 601 are determined, the color space conversion in accordance with the determined contents is performed. In the color material control color space conversion 602, conversion to maintain the pure color state of the color material is performed so that another color material does not mix in the portion desired to be printed by only a single specific color material (in the present embodiment, ink). In the standard color space conversion 603, conversion that gives importance to color reproducibility and allows another color material to mix with the specific color material without securing the pure color state of the color material is performed. In both the color space conversions, the conversion parameters stored in the large-capacity storage unit 505 are used. At this time, which of CMYK and RGB to select is determined arbitrarily by a user by taking into consideration the skill of the conversion parameter creation, the restrictions by the conversion parameter creation tool, and the like. For example, in a case where the ink that is used for printing includes also particular colors, such as orange, green, and blue, not only the four colors of CMYK, it is difficult to create conversion parameters that secure color reproducibility. Because of this, a color separation process 604 that follows is caused to perform color separation and RGB are selected, not CMYK. The color space after the conversion in the color material control color space conversion 602 depends on the ink that is used for printing and only CMYK are included, and therefore, conversion into RGB is not performed.

In a case where conversion into the RGB color space is performed in the standard color space conversion 603, the RGB image signal values are converted into the CMYK signal values corresponding to the ink colors that are used in the printing apparatus 510 in the color separation process 604. At this time, a three-dimensional lookup table (LUT) stored in advance in the large-capacity storage unit 514 is referred to and the RGB signal values are taken as the input values and converted into CMUK signal values associated by the LUT.

After that, the CMYK signal values, which are the output values obtained by the color separation process 604, or the CMYK signal values after being converted in the color conversion process 601 in the image processing apparatus 500 are input to a tone correction process 605. In the tone correction process 605, the primary conversion is performed for each ink so that the density represented on a printing medium (sheet) can maintain a linear relationship with the input signal values. At this time, a one-dimensional LUT for each ink, which is stored in advance in the large-capacity storage unit 514, is referred to. It is assumed that all the pieces of the signal value conversion processing performed in the color conversion process 601, the large-capacity storage unit 505, and the color separation process 604 are performed with about 8-bit multi-valued signals.

The multi-valued data for which the tone correction has been performed is input to a quantization process 606 and converted into binary data that indicates printing of a dot by "1" and non-printing of a dot by "0" for each ink. After that, the binary data is sent to the printing engine 515 and the ejection operation in accordance with the binary data is performed by the print head.

(Details of Color Material Control Color Space Conversion)

Next, the conversion method in the above-described color material control color space conversion 602 is explained in detail. In the present embodiment, there are two kinds of conversion pattern: a first conversion pattern in which input CMYK signal values are converted into output CMYK signal values in a device-dependent color space and a second conversion pattern in which input RGB signal values are converted into output CMYK signal values in a device-dependent color space. In the following, each conversion pattern is explained.

First, the first conversion pattern is explained. FIG. 7A is a diagram showing an example of a relationship between input signal values and output signal values in the first conversion pattern. In a case of the first conversion pattern, input CMYK signal values from the rendering process 600 are converted into a device-dependent CMYK color space and the converted output CMYK signal values are input to the tone correction process 605. In a case of this first conversion pattern, it is assumed that the color of one of CMYK, whose signal value is a value other than 0% and the signal values of the other colors are 0%, is taken as a pure color. Then, the pure color state is maintained by inputting the portions whose signal value is 0% to the tone correction process 605 while keeping 0%. The simplest conversion method for implementing this is as follows. First, for the pure colors, as shown in "Output-1 (pure color maintained)" in FIG. 7A, conversion is not performed in the color material control color space conversion 602. Then, for the colors other than the pure colors, as shown in "Output-2 (normal conversion)", conversion that gives importance to color reproducibility is performed in the standard color space conversion 603. In the present embodiment, the color space after the conversion in the color material control color space conversion 602 is CMYK, but this is not limited. For example, as the conversion parameters that are used in the color separation process 604, conversion parameters designed to maintain the pure color as shown in FIG. 7B, to be described later, are prepared separately from the normal conversion parameters, and the conversion parameters that are used are switched appropriately. Due to this, it is possible to obtain the same effect while the color space after the conversion in the color material control color space conversion 602 is RGB. Further, in the present embodiment, the input/output values are represented by 0 to 100% and this means that the signal value of 100% is "255" in a case where, for example, the signal value is represented by eight bits.

Next, the second conversion pattern is explained. FIG. 7B is a diagram showing an example of a relationship between input signal values and output signal values in the second conversion pattern. In a case of the second conversion patter, the input RGB signal values from the rendering process 600 are converted into the device-dependent CMYK color space and the converted output CMYK signal values are input to the tone correction process 605. In a case where the input signal value is represented in the RGB color space, unlike a case where the input signal value is represented in the CMYK color space, it is necessary to take into consideration the correspondence relationship between the RGB signal values and each ink color and conversion is indispensable. Consequently, in this second conversion pattern, CMYK complementary color conversion is performed for the input RGB signal values to find the complementary colors thereof and based on the found complementary colors, whether the color specified by the input RGB signal values is a pure color is determined. Then, in a case where the color is determined to be a pure color, the color component whose signal value is 0% in the results of the CMYK complementary color conversion is caused to be 0% also in the output signal value. Formula (1) shown below is an example of the CMYK complementary color conversion formula that is used in the present embodiment.

In a case where R=G=B,

Cyan=0%

Magenta=0%

Yellow=0%

Black=100%−$R$ otherwise, $A$=MIN(100%−$R$,100%−$G$,100%−$B$)

Cyan=(100%−R−A)/(100%−A)

Magenta=(100%−G−A)/(100%−A)

Yellow=(100%−B−A)/(100%−A)

Black=0%　　　　　　　　　　　　　　formula (1)

In formula (1) described above, MIN (x, y, z) is the function that returns the minimum value of x, y, and z. Then, the results obtained by using formula (1) described above are shown in "Pure color determination complementary color conversion results" in FIG. 7B. In a case where one of the CMYK signal values is a value other than 0% and the other signal values are 0% in "Pure color determination complementary color conversion results", the color is a pure color, and therefore, the pure color state is maintained by leaving the portion whose signal value is 0% as it is. Formula (1) described above is just a conversion formula for determining whether a color is a pure color. The actual output CMYK signal values are values to which a dot gain or the like is added, such as those shown in "Output-1 (pure color maintained) in FIG. 7B.

At this time, in a case where there is a large difference between "Output-1 (pure color maintained)", which is the output results of the color material control color space conversion 602, and "Output-2 (normal conversion)", which is the output results of the standard color space conversion 603, the boundary portion at which both the output results are adjacent to each other becomes unnatural. In the following, detailed explanation is given.

Figure 8A:
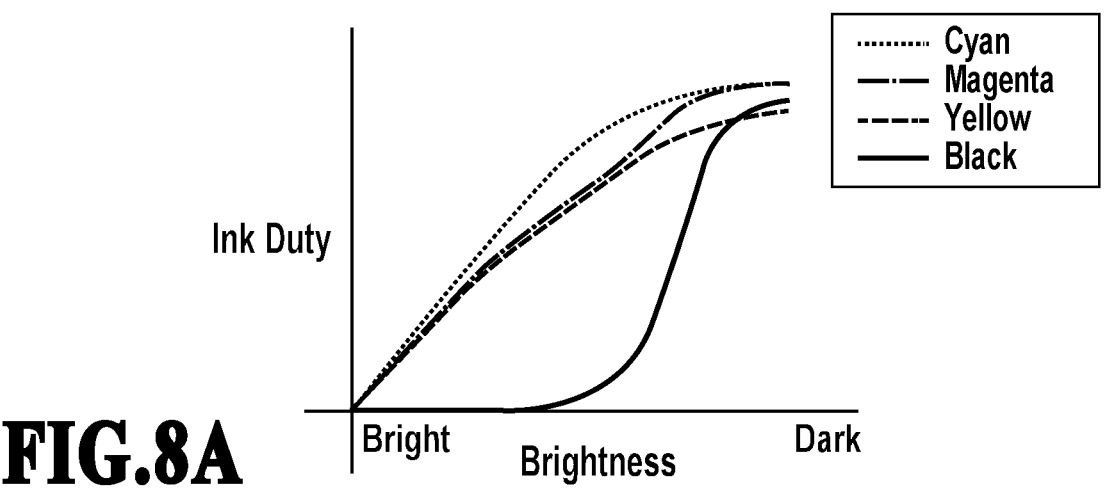
FIG. 8A to FIG. 8C are each a definition table showing how to use ink in a gray axis.
Figure 8B:
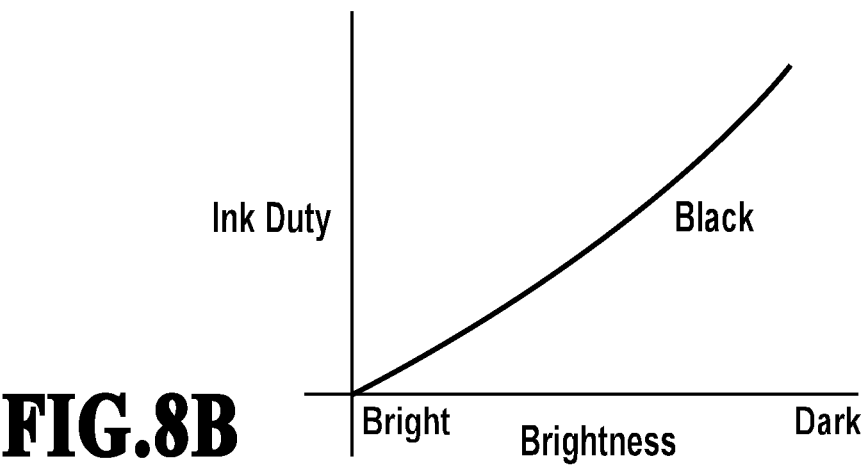

FIG. 8A is a definition table showing how to use the four common kinds of ink of CMYK in the gray axis and the vertical axis represents ink duty and the horizontal axis represents brightness. In general, in a case where the K ink is used from the portion whose brightness is high, the granularity is conspicuous, and therefore, image quality is reduced. Consequently, in a case where importance is given to image quality, a method is adopted in which gray is represented by only the CMY inks at the portion whose brightness is high and the K ink is begun to be used from the portion whose brightness is lower than or equal to a predetermined value. FIG. 8B is a definition table showing how to use the K ink in a case where the color in the gray axis is represented by only the K ink (pure color). Here, it is assumed that the color material control color space conversion 602 is performed by using the definition table in FIG. 8B for input CMYK signal values of (C, M, Y, K)=(0%, 0%, 0%, 30%) of an object. Then, in a case where the input CMYK signal values of an object adjacent to the object are (C, M, Y, K)=(0%, 0%, 1%, 30%), to the input CMYK signal values, the standard color space conversion 603 is applied by using the definition table in FIG. 8A. As a result of that, the objects whose appearances are substantially the same on the color space of the input image are visually recognized as objects whose image qualities are different in the printing results. In this case, on a condition that the definition table in FIG. 8B that is used in the color material control color space conversion 602 is changed, it is no longer possible to maintain the pure color state. Consequently, the definition table in FIG. 8A that is used in the standard color space conversion 603 is modified as follows.

Figure 8C:
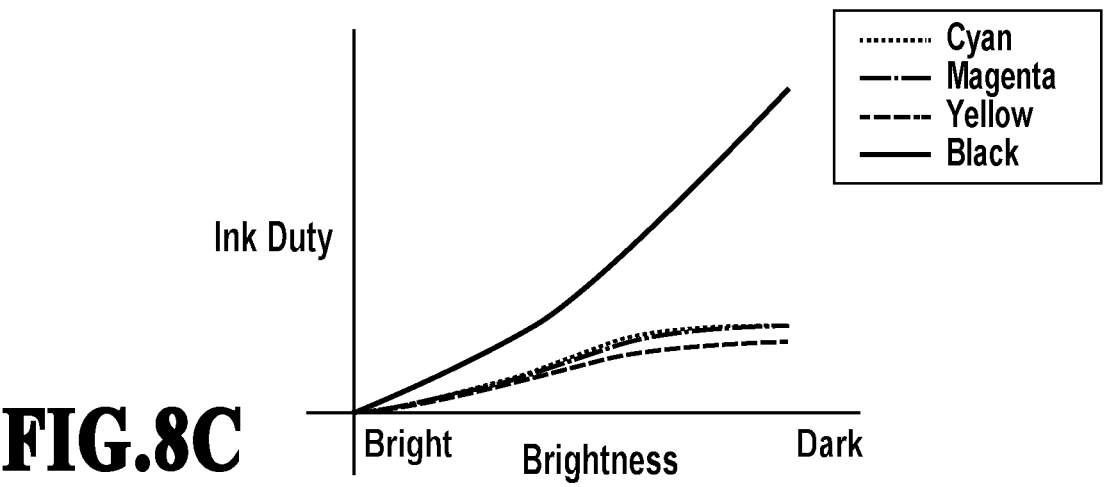

Originally, the difference between the definition table in FIG. 8A and the definition table in FIG. 8B lies in that the CMY inks are used much instead of using the K ink in a case where (C, M, Y, K)=(0%, 0%, 0%, 30%). Consequently, the definition table in FIG. 8A is changed into that as in FIG. 8C by performing modification so that the definition table in FIG. 8A becomes close to the definition table in FIG. 8B. The output values based on FIG. 8C are shown in "Output-2" in FIG. 7B described previously. Due to this, it is possible to suppress a reduction in image quality accompanying the switch between the color material control color space conversion 602 and the standard color space conversion 603.

In the present embodiment, explanation is given by taking the black ink whose pure color state is maintained as an example, but it is similarly possible to apply this to a chromatic ink. In that case, it may also be possible to maintain the pure color state for all the chromatic inks or to maintain the pure color state for a part of the inks (for example, yellow ink). Further, in the present embodiment, the pure color state is maintained for any pure color at any tone value, but for example, it may also be possible to maintain the pure color state only in a case where the input signal value is larger than or equal to a predetermined value (for example, in a case where the input signal value is 100%).

(Conversion Parameter Setting UI)

Figure 9A:
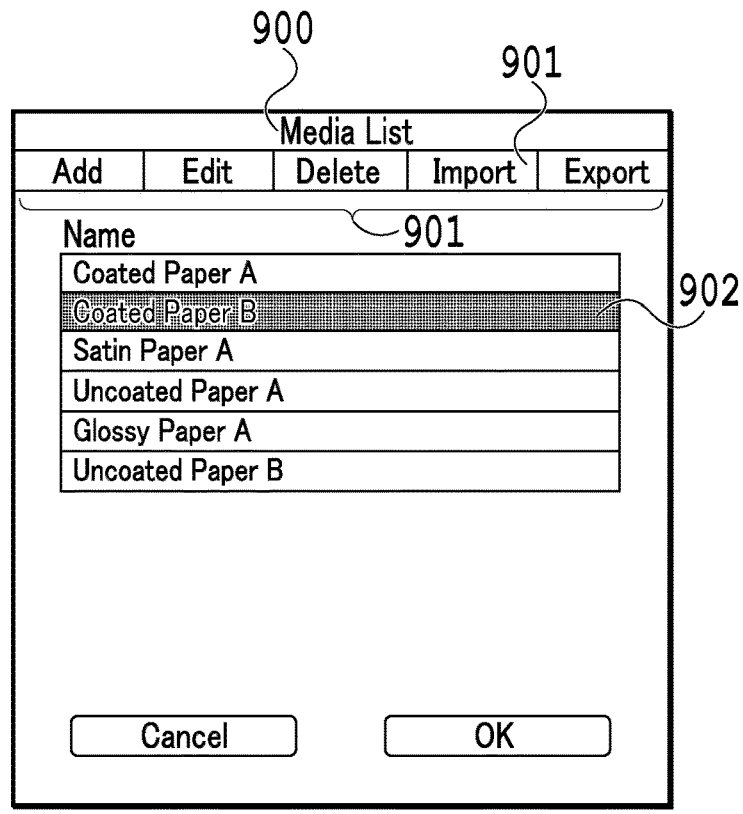
FIG. 9A and FIG. 9B are each a diagram showing an example of a UI screen for a user to set a conversion parameter used for a color space conversion process.
Figure 9B:
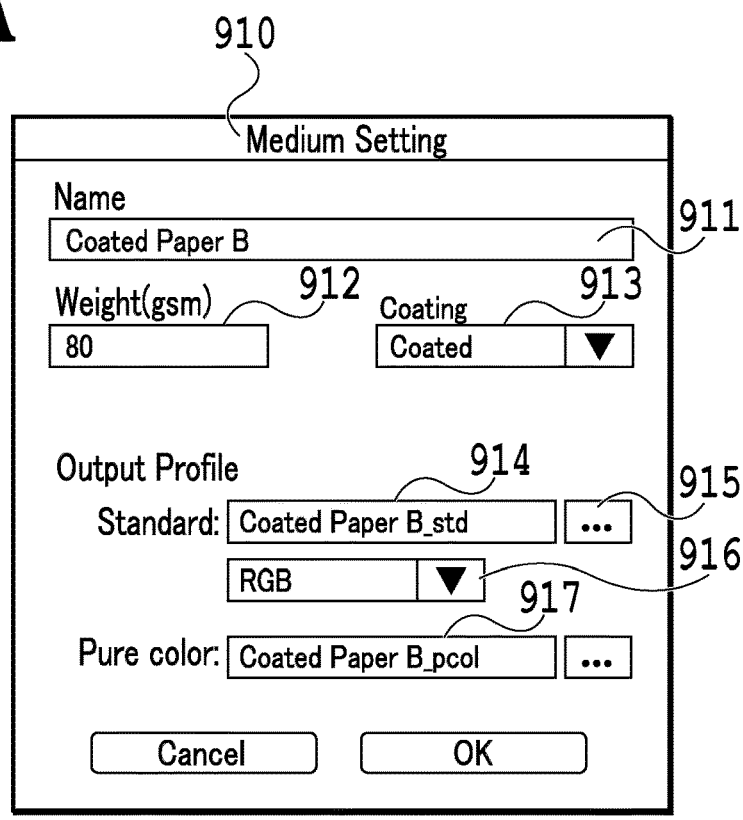

FIG. 9A and FIG. 9B are each an example of a UI screen for a user to set conversion parameters used in the color conversion process 601, which is displayed on the UI unit 501 of the image processing apparatus 500. The conversion parameters of both the color material control color space conversion 602 and the standard color space conversion 603 are set and saved in association with printing media (in the following, described as "media"), such as a sheet, which are used in the printing system. A Media List screen 900 shown in FIG. 9A is a UI screen for a user to display, register, and so on of media used in the printing system. There are five kinds of button as a menu button 901 and by which, it is possible to receive instructions from a user to add new media, edit or delete existing media, import or export by a file, and so on. In a case an "Add" or "Edit" button is pressed down, a Medium Setting screen 910 shown in FIG. 9B is displayed. In a "Name" field 911 within the Medium Setting screen 910, the name of media is input and in a "Weight" field 912, the weight of media per unit area is input. A "Coating" field 913 is for designating the kind of coating of the surface of the media and it is possible for a user to select the kind from candidates displayed in a pull-down menu. In a "Standard" field 914 of "Output Profile", a conversion parameter that is used in the standard color space conversion 603 is designated. By pressing down a reference button 915, a file selection dialog (not shown schematically) is displayed and in a case where a user selects an arbitrary file, the conversion parameter specified by the file is set. At this time, it is necessary to set a color space after conversion by using a pull-down menu 916, but the color space is determined uniquely by the conversion parameter, and therefore, it may also be possible for the side of the system to analyze the contents of the set conversion parameter and automatically set the color space. A "Pure color" field 917 is for designating a conversion parameter that is used in the color material control color space conversion 602 and the conversion parameter is set by the same method as that of the "Standard" field 914 described above. In a case where the Medium Setting screen 910 is displayed by pressing down the "Add" button, each field is blank or a provisional value is input therein.

(Contents Determination Processing of Color Conversion Process)

Next, processing to determine contents of the color conversion process is explained in detail. In this determination processing, which of the color material control color space conversion 602 and the standard color space conversion 603 to apply to the image signal values of the document image after the rendering processing is determined based on the setting (color conversion setting) specifying the condition of the color conversion in the image processing apparatus 500.

As the color conversion setting in the present embodiment, there are two kinds of color conversion setting, that is, "entire color setting" targeted for the entire printing system and "individual color setting" targeted for an individual print job. In the present embodiment, explanation is given on the assumption that the entire color setting targeted for the entire printing system is applied in principle and in a case where the color setting is designated individually for the print job, this color setting is applied with priority. However, to which color setting priority is given is arbitrary.

Figure 10A:
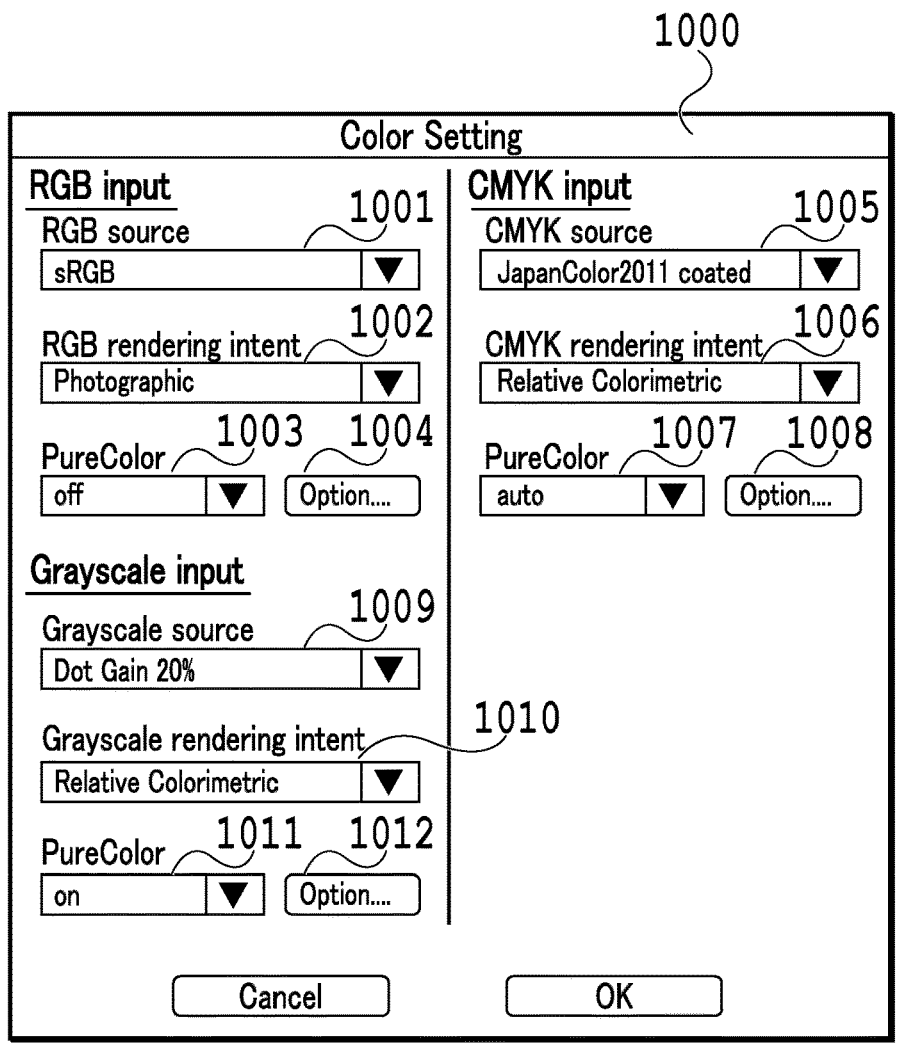
FIG. 10A and FIG. 10B are each a diagram showing an example of a UI screen for setting an entire color.
Figure 10B:
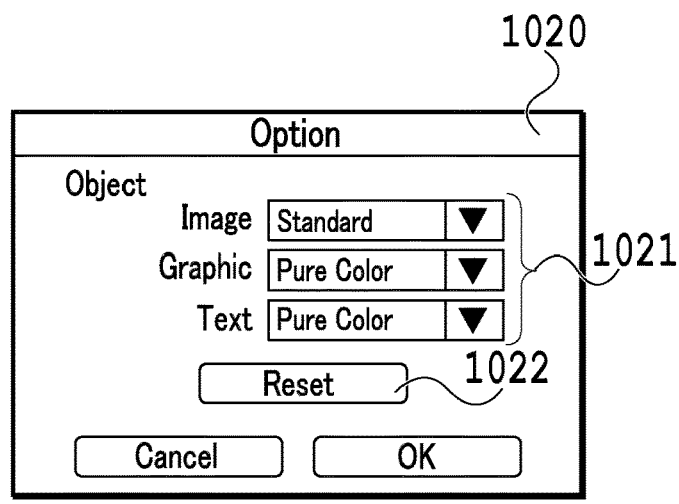

FIG. 10A and FIG. 10B are each a diagram showing an example of an entire color setting UI screen, which is displayed on the UI unit 501 of the image processing apparatus 500. On an entire Color Setting UI screen 1000 shown in FIG. 10A, the setting relating to conversion into a device color space is performed for each color space that is set to the object within the input document image. On the entire Color Setting UI screen 1000, in "RGB source" 1001, a color space is set, which is applied in a case where there is no detailed designation of a color space for the input document image of RGB. In a case where sRGB is set, processing is performed by regarding the definition of the input RGB signal values as sRGB. In "RGB rendering intent" 1002, a compression method at the time of color space conversion from RGB is set. As the compression method, "Perceptual", "Saturation", "Relative Colorimetric", and "Absolute Colorimetric" are generally well known and in the present embodiment also, it is made possible to designate these four kinds. In a case where "Absolute Colorimetric" is set, it may also be possible to cause the standard color space conversion 603 to be applied at all times by giving priority to color reproduction instead of using a variety kinds of automatic determination, to be described in the following.

In "Pure Color" 1003, whether to perform conversion by the color material control color space conversion 602 at the time of color space conversion from RGB is set. For this setting, there are three kinds, that is, "on", "off", and "auto". "on" is the setting to convert all the input RGB signal values by the color material control color space conversion 602 and "off" is the setting to convert all the input RGB signal values by the standard color space conversion 603. Further, "auto" is the setting to perform automatic switch in accordance with an option setting and by pressing down an "Option" button 1004, an Option setting screen 1020, to be described later, is displayed. "CMYK source" 1005 corresponds to "RGB source" 1001 described above and a color space is set, which is applied in a case where there is no detailed designation of a color space for the input document image of CMYK. Symbols 1006 to 1008 correspond to 1002 to 1004 described above, respectively. "Grayscale source" 1009 also corresponds to "RGB source" 1001 described above and a color space is set, which is applied in a case where there is no detailed designation of a color space for the input document image of grayscale. Symbols 1010 to 1012 correspond to 1002 to 1004 described above, respectively.

On the Option setting screen 1020, in a pull-down menu 1021, which of the color material control color space conversion 602 (Pure Color) and the standard color space conversion 603 (Standard) to apply to each object of image, graphic, and text is set.

The initial setting is, for example, "Standard" for image because it is desired to perform conversion by giving importance to reproducibility and "Pure Color" for text and graphic because it is desired to avoid a plane deviation of character and line. It is also possible to perform these settings in a case where the color space that is set for the object of the input document image is CMYK or grayscale. For example, many photos are input in RGB, and therefore, in the option setting in "RGB input", "Standard" is set for image. Further, many decorated characters are input in CMYK, and therefore, in the option setting in "CMYK input", "Pure Color" is set for image. By doing so, it is possible to perform printing by automatically switching between conversion by the color material control color space conversion 602 and color conversion by the standard color space conversion 602 without performing processing individually for each object of the input image.

FIG. 11A to FIG. 11D are each a diagram showing an example of the individual color setting UI screen and these screens are displayed on the UI unit 501 of the image processing apparatus 500 like the entire color setting UI screen 1000. On an individual Color Setting UI screen 1100, the individual setting for a target print job is performed. On the individual Color Setting UI screen 1100, in "Page Setting" 1101, the page to which the individual setting is applied is designated. In a case where "Common to all pages" is designated in "Page Setting" 1101, the contents designated in "Color Conversion Setting" 1102 are applied to all the pages in the job. In a case where "auto" is designated in "Color Conversion Setting" 1102 and an "Option" button 1103 is pressed down, the Option setting screen 1020 described previously is displayed. The contents that can be set on the Option setting screen 1020 are as those described previously. In a case where "Photo quality prioritized" is designated in "Color Conversion Setting" 1102, the standard color space conversion 603 is applied to the entire page and in a case where "Character/line quality prioritized" is designated, the color material control color space conversion 602 is applied to the entire page and then each color conversion is performed. In a case where "Automatic priority determination" is designated, the occupied area of each object included within the page is calculated for each page and whether to apply the color material control color space conversion 602 or to apply the standard color space conversion 603 is determined based on the calculation results. For example, for the page in which the object whose occupied area is the largest among each object is the image object, the standard color space conversion 603 is applied to the entire page and to the page in which the occupied area of an object other than the image object is the largest, the color material control color space conversion 602 is applied. Alternatively, for the page in which the object whose occupied area is the largest among the objects within the page is the text object, the color material control color space conversion 602 is applied to the entire page with the text object being taken as a reference. Then, an aspect may also be accepted in which to the page in which the occupied area of an object other than the text object is the largest, the standard color space conversion 603 is applied. Alternatively, an aspect may also be accepted in which the color conversion method that is applied is determined based on the determination of whether the occupied area of the image object or the text object exceeds a predetermined ratio or a predetermined threshold value.

Figure 11A:
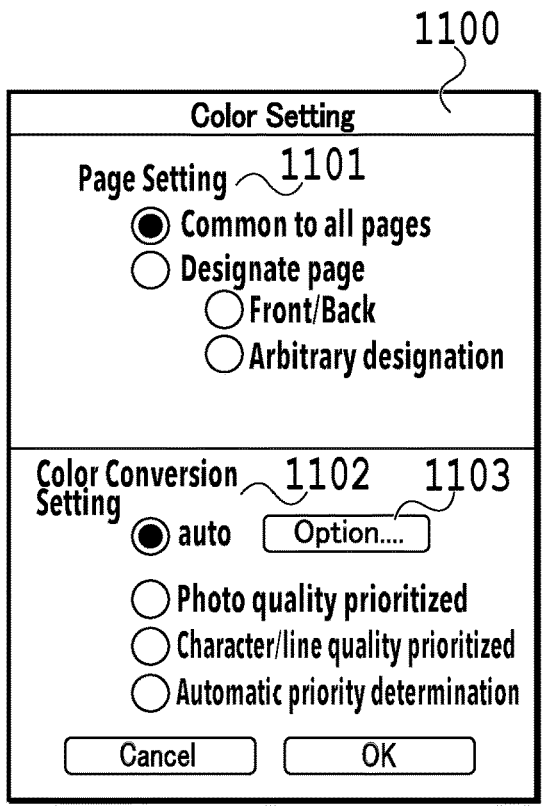
FIG. 11A to FIG. 11D are each a diagram showing an example of a UI screen for setting an individual color.
Figure 11B:
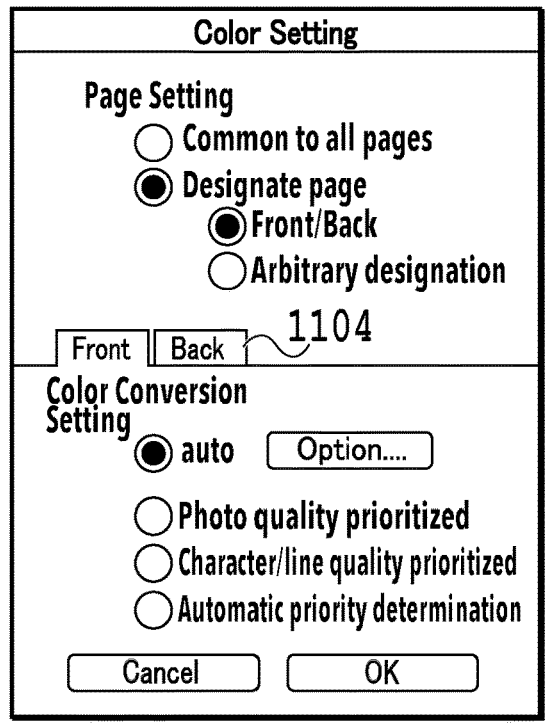
Figure 11C:
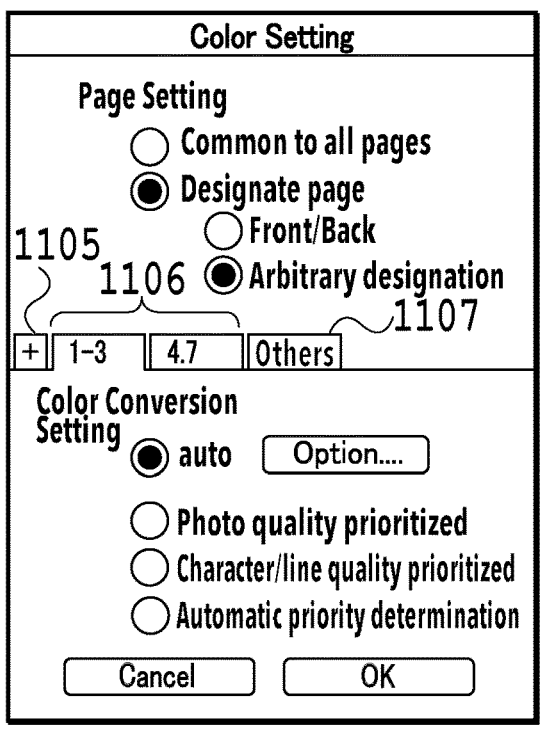
Figure 11D:
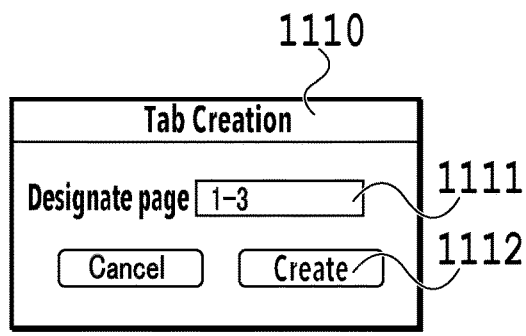

Further, it may also be possible to make the setting different for each page in "Page Setting" 1101, The printing media include media whose surface quality of the front surface is different from that of the back surface. For example, media having the front surface whose the surface quality is glossy for printing of a photo and the back surface whose surface quality is matte for printing of a character. In the double-side printing for the media such as these, it is preferred to perform printing that gives importance to reproducibility for the front surface and perform printing that keeps quality of character and line for the back surface. In this case, on a condition that "Front/Back" is selected in "Page Setting" 1101, tabs (Front/Back tabs) 1104 of "Front" and "Back" appear as shown in FIG. 11B and it is possible for a user to perform the color setting for each of the front surface and the back surface. Further, in a case where a user desires to perform the common color setting for a plurality of pages (page group), the user selects "Arbitrary designation" in "Page Setting" 1101. Then, as shown in FIG. 11C, a "+" button (tab addition button) 1105 appears. In this state, the same setting is still applied to all the pages. In a case where the tab addition button 1105 is pressed down, a Tab Creation screen 1110 shown in FIG. 11D appears. Then, a user inputs page numbers of a plurality of pages to which the user desires to apply the same setting in a "Designate page" field 1111. In a case where a "Create" button 1112 is pressed down, page group tabs 1106 corresponding to the input page numbers appear and to the Color Setting screen having been displayed so far, an "Others" tab 1107 is attached. The plurality of the page group tabs 1106 is created by the tab addition button 1105 being pressed down repeatedly, but in a case where a page included in the page group already created is designated again, a user is notified of an error at the time of the "Create" button 1112 being pressed down.

As above, according to the present embodiment, by performing printing by using only specific color materials, it is possible to use the color conversion methods separately for the portion whose print quality and cost are desired to be controlled and the other portion. Due to this, even in a case where the portion for which it is desired to give importance to document color reproducibility and the portion whose print quality and cost are desired to be controlled exist in a mixed manner within one print job, it is possible to perform desirable color conversion for each portion.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present invention is not limited to the embodiments described above and various changes and modifications can be made without departing from the sprit and scope of the present invention. Consequently, in order to make public the scope of the present invention, the following claims are attached.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image processing apparatus comprising:
at least one processor or circuit configured to function as a plurality of units comprising:
a color conversion unit configured to convert an input color space of document image data into a device-dependent color space specified by a plurality of color materials for printing an image; and
an output unit configured to output document image data converted into the device-dependent color space, wherein
the color conversion unit performs, in a case where document image data includes a first kind of object and a second kind of object different from the first kind, the conversion by selectively applying, based on a color conversion setting that specifies a condition of the conversion, a first color conversion method of converting data corresponding to the first kind of object into data represented in a first color space and a second color conversion method of converting data corresponding to the second kind of object into data represented in a second color space different from the first color space within one print job; and
the color conversion setting includes a first color conversion setting targeted for all print jobs that are input and a second color conversion setting targeted for an individual print job that is input.

2. The image processing apparatus according to claim 1, wherein
for a portion that is represented in a single color in document image data, in the first color conversion method, use of color materials is limited so that the portion is represented by a single color material and in the second color conversion method, use of color materials is permitted so that the portion is represented by a plurality of color materials.

3. The image processing apparatus according to claim 2, wherein
the color conversion unit performs, in a case where the color space of the document image data is CMYK and the device-dependent color space is CMYK, color conversion so that a portion at which one signal value of input CMYK signal values of the document image data is a value other than 0% and the other signal values are 0% is taken as a portion that is represented by a single color in document image data and the portion is not represented by a plurality of color materials.

4. The image processing apparatus according to claim 2, wherein
the color conversion unit performs, in a case where the color space of the document image data is RGB and the device-dependent color space is CMYK, CMYK complementally color conversion for input RGB signal values of the document image data and performs color conversion so that a portion at which one of obtained CMYK signal values is a value other than 0% and the other signal values are 0% is taken as a portion that is represented in a single color in document image data and the portion is not represented by a plurality of color materials.

5. The image processing apparatus according to claim 1, wherein
in the first color conversion setting, which of the first color conversion method and the second color conversion method to apply is set in association with a color space used when a document image data is created.

6. The image processing apparatus according to claim 1, wherein
in a case where the determination unit determines a color conversion method that is applied based on the first color conversion setting, a unit by which the color conversion method that is applied selectively within one print job is the kind of object included in a document image data.

7. The image processing apparatus according to claim 1, wherein
in the second color conversion setting, a quality to which priority is given at the time of printing is designated and the determination unit:
determines, in a case where a photo quality is designated as a quality to which priority is given at the time of the printing, the second color conversion method as a color conversion method that is applied; and
determines, in a case where a character or line quality is designated as a quality to which priority is given at the time of the printing, the first color conversion method as a color conversion method that is applied.

8. The image processing apparatus according to claim 1, wherein
in the second color conversion setting, whether to automatically determine a quality to which priority is given at the time of printing is designated and
the determination unit determines, in a case where the automatic determination is designated, which of the first color conversion method and the second color conversion method to apply by calculating an occupied area of an object included within each page of a document image data for each page and based on the calculation results.

9. The image processing apparatus according to claim 8, wherein
the determination unit determines, based on the calculation results, the second color conversion method as a color conversion method that is applied for a page in which an object whose occupied area is the largest is an image object.

10. The image processing apparatus according to claim 8, wherein
the determination unit determines, based on the calculation results, the first color conversion method as a color conversion method that is applied for a page in which an object whose occupied area is the largest is a text object.

11. The image processing apparatus according to claim 1, wherein
in a case where the determination unit determines a color conversion method that is applied based on the second color conversion setting, the color conversion method that is applied selectively within one print job is each surface of a front surface and a back surface in double-side printing.

12. The image processing apparatus according to claim 1, the at least one processor or circuit is further configured to function as:
a reception unit configured to receive the color conversion setting from a user.

13. The image processing apparatus according to claim 1, wherein
the first kind is an image and the second kind is a character or a line drawing.

14. The image processing apparatus according to claim 1, wherein
the color conversion unit performs the conversion by using a lookup table or a function.

15. An image processing method comprising:
converting an input color space of document image data into a device-dependent color space specified by a plurality of color materials for printing an image; and
outputting the document image data converted into the device-dependent color space, wherein
at the converting, in a case where document image data includes a first kind of object and a second kind of object different from the first kind, a first color conversion method of converting data corresponding to the first kind of object into data represented in a first color space and a second color conversion method of converting data corresponding to the second kind of object into data represented in a second color space different from the first color space are selectively applied within one print job based on a color conversion setting that specifies a condition of the conversion; and
the color conversion setting includes a first color conversion setting targeted for all print jobs that are input and a second color conversion setting targeted for an individual print job that is input.

16. A non-transitory computer readable storage medium storing a program for causing a computer to perform an image processing method comprising:
converting an input color space of document image data into a device-dependent color space specified by a plurality of color materials for printing an image; and
outputting the document image data converted into the device-dependent color space, wherein
at the converting, in a case where document image data includes a first kind of object and a second kind of object different from the first kind, a first color conversion method of converting data corresponding to the first kind of object into data represented in a first color space and a second color conversion method of converting data corresponding to the second kind of object into data represented in a second color space different from the first color space are selectively applied within one print job based on a color conversion setting that specifies a condition of the conversion; and
the color conversion setting includes a first color conversion setting targeted for all print jobs that are input and a second color conversion setting targeted for an individual print job that is input.

* * * * *